(12) United States Patent
Lu

(10) Patent No.: US 12,355,909 B2
(45) Date of Patent: Jul. 8, 2025

(54) SUPPORTING ATTACHMENT AND MOBILE ELECTRONIC DEVICE CASING

(71) Applicant: EVOLUTIVE LABS CO., LTD., Taipei (TW)

(72) Inventor: Jui-Chen Lu, Taichung (TW)

(73) Assignee: EVOLUTIVE LABS CO., LTD., Taipei (TW)

( * ) Notice: Subject to any disclaimer, the term of this patent is extended or adjusted under 35 U.S.C. 154(b) by 243 days.

(21) Appl. No.: 18/359,914

(22) Filed: Jul. 27, 2023

(65) Prior Publication Data

US 2024/0372937 A1    Nov. 7, 2024

(30) Foreign Application Priority Data

May 4, 2023    (TW) ................................. 112204294

(51) Int. Cl.

| | | |
|---|---|---|
| *G06F 1/16* | (2006.01) | |
| *H04M 1/02* | (2006.01) | |
| *H05K 5/00* | (2025.01) | |
| *H05K 7/00* | (2006.01) | |

(52) U.S. Cl.
CPC ................................. *H04M 1/0283* (2013.01)

(58) Field of Classification Search
CPC ............. H04M 1/0283; H04M 1/0279; H04M 1/0202; G06F 1/1628; G06F 1/1629; G06F 1/1632
See application file for complete search history.

(56) References Cited

U.S. PATENT DOCUMENTS

| | | | | |
|---|---|---|---|---|
| 8,317,152 | B1 * | 11/2012 | Zhou | F16M 13/00 |
| | | | | 248/397 |
| 8,543,635 | B2 * | 9/2013 | Simkins | H03K 19/17732 |
| | | | | 708/670 |
| D704,199 | S * | 5/2014 | Byun | D14/447 |
| D708,187 | S * | 7/2014 | Xiang | D14/447 |
| 9,159,309 | B2 * | 10/2015 | Liu | H04R 1/02 |
| 9,377,154 | B2 * | 6/2016 | Hung | F16M 11/22 |
| 11,973,891 | B2 * | 4/2024 | Little | H04M 1/04 |
| 12,031,565 | B2 * | 7/2024 | Olson | F16B 47/006 |
| 2012/0168577 | A1 * | 7/2012 | Cheng | G06F 1/1626 |
| | | | | 248/176.3 |
| 2012/0168581 | A1 * | 7/2012 | Cheng | F16M 11/041 |
| | | | | 248/278.1 |
| 2013/0009031 | A1 * | 1/2013 | Cheng | F16M 11/10 |
| | | | | 248/371 |
| 2017/0013950 | A1 * | 1/2017 | Rieger | F16M 11/041 |
| 2021/0022257 | A1 * | 1/2021 | Yu | F16M 13/005 |

\* cited by examiner

Primary Examiner — Anthony M Haughton

(57) ABSTRACT

A supporting attachment adapted for a mobile electronic device or a mobile electronic device casing is provided. The supporting attachment includes a joining member, a first supporting member, at least one expanding member and a second supporting member. The joining member is adapted to be attached on the mobile electronic device or the mobile electronic device casing. The expanding member is connected between the joining member and the first supporting member, and the first supporting member is selectively located in a retracted position or an expanded position relative to the joining member through the expanding member. The second supporting member is pivoted to the first supporting member and adapted to abut against a supporting surface. Besides, a mobile electronic device casing adapted for a mobile electronic device is also provided.

24 Claims, 17 Drawing Sheets

1

SUPPORTING ATTACHMENT AND MOBILE ELECTRONIC DEVICE CASING

CROSS-REFERENCE TO RELATED APPLICATION

This non-provisional application claims priority under 35 U.S.C. § 119(a) on Patent Application No. 112204294 filed in Taiwan, R.O.C. on May 4, 2023, the entire contents of which are hereby incorporated by reference.

BACKGROUND OF THE INVENTION

1. Field of the Invention

The present disclosure relates to a supporting attachment and a mobile electronic device casing, and more particularly to a supporting attachment and a mobile electronic device casing capable of enhancing supporting stability and increasing support modes.

2. Description of the Related Art

Mobile devices, such as smartphones, tablets, and personal digital assistants, are indispensable daily items in today's society. Typically, when these mobile electronic devices are placed on a supporting surface like a desk, users often use corresponding support attachments or cases with built-in support functionality to achieve a more comfortable viewing angle of the device's screen surface. By adjusting the support accessories or cases, users can position the mobile electronic device at a specific angle on the supporting surface, thus enhancing the comfort of reading or using the device.

However, most of the conventional support attachments available in the market can only provide a single-angle support mode. When users have diverse usage requirements, such as viewing the screen in landscape or portrait mode, the existing support attachments fail to meet these needs. Furthermore, taking flip-style support accessories as an example, users need to unfold the support component and use it as the supporting point for the mobile electronic device to stand. Yet, the distance between the supporting point of the support component and the pivot point of the unfolding mechanism is relatively short. Even a slight external force in the opposite direction of the unfolding can cause the support component to collapse, resulting in the mobile electronic device toppling over on the desk. In severe cases, the device may be damaged due to the oscillation caused by the collapse.

BRIEF SUMMARY OF THE INVENTION

Aspects and advantages of embodiments of the present disclosure will be set forth in part in the following description, or may be learned from the description, or may be learned through practice of the embodiments.

An example aspect of the present disclosure is directed to a supporting attachment adapted for a mobile electronic device or a mobile electronic device casing. The supporting attachment includes a joining member, a first supporting member, at least one expanding member and a second supporting member. The joining member is adapted to be attached on the mobile electronic device or the mobile electronic device casing. The expanding member is connected between the joining member and the first supporting member, and the first supporting member is selectively located in a retracted position or an expanded position relative to the joining member through the expanding member. The second supporting member is pivoted to the first supporting member and adapted to abut against a supporting surface.

In some implementations, the supporting attachment further includes a second pivoting member. The second supporting member is pivoted to the first supporting member through the second pivoting member, and the first supporting member and the second supporting member are adapted to be located at two sides of the second pivoting member.

In some implementations, the expanding member includes a first end passing through the joining member and a second end connected to the first supporting member.

In some implementations, amount of the expanding members is two. The expanding members are symmetrically disposed relative to the first supporting member. The second ends of the expanding members are away from the joining member when the first supporting member is located in the expanded position.

In some implementations, the joining member includes an abutting portion selectively abutting against the first end.

In some implementations, the supporting attachment further includes a first pivoting member separated from the second end, and the first supporting member is pivoting to the joining member through the first pivoting member.

In some implementations, the expanding member is formed with a limiting feature, and the joining member includes a limiting portion engaged with the limiting feature.

In some implementations, the supporting attachment further includes a magnetic member or a magneto receiving member, and the magnetic member or the magneto receiving member is adapted to be magnetically connected to the mobile electronic device or the mobile electronic device casing.

In some implementations, the joining member is formed with a magnet accommodating portion adapted to accommodate the magnetic member or the magneto receiving member.

In some implementations, the supporting attachment further includes a second pivoting member extending parallel to a normal to adjoining surfaces of the first supporting member and the second supporting member, and the second supporting member is pivoted to the first supporting member through the second pivoting member.

In some implementations, a tilted portion is formed on a periphery of the joining member, and a clearance is formed between an end of the tilted portion and the first supporting member.

Another example aspect of the present disclosure is directed to a mobile electronic device casing adapted for a mobile electronic device. The mobile electronic device casing includes a main body, a first supporting member, at least one expanding member and a second supporting member. The main body is adapted to accommodate the mobile electronic device. The expanding member is connected between the main body and the first supporting member, and the first supporting member is selectively located in a retracted position or an expanded position relative to the main body through the at least one expanding member. The second supporting member is pivoted to the first supporting member and adapted to abut against a supporting surface.

In some implementations, the mobile electronic device casing further includes a second pivoting member. The second supporting member is pivoted to the first supporting member through the second pivoting member, and the first supporting member and the second supporting member are adapted to be located at two sides of the second pivoting member.

In some implementations, the expanding member includes a first end passing through the main body and a second end connected to the first supporting member.

In some implementations, amount of the expanding members is two. The expanding members are symmetrically disposed relative to the first supporting member. The second ends of the expanding members are away from the main body when the first supporting member is located in the expanded position.

In some implementations, the main body includes an abutting portion selectively abutting against the first end.

In some implementations, the mobile electronic device casing further includes a first pivoting member separated from the second end, and the first supporting member is pivoting to the main body through the first pivoting member.

In some implementations, the expanding member is formed with a limiting feature, and the main body includes a limiting portion engaged with the limiting feature.

In some implementations, the mobile electronic device casing further includes a second pivoting member extending parallel to a normal to adjoining surfaces of the first supporting member and the second supporting member, and the second supporting member is pivoted to the first supporting member through the second pivoting member.

In some implementations, a tilted portion is formed on a periphery of the main body, and a clearance is formed between an end of the tilted portion and the first supporting member.

In some implementations, the first supporting member or the second supporting member is formed with a communication component accommodating portion adapted to accommodate a wireless communication component.

In some implementations, the second pivoting member includes a positioning portion, and the second supporting member is formed with a positioning feature adapted to be engaged with the positioning portion.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION OF THE INVENTION

Figure 1:
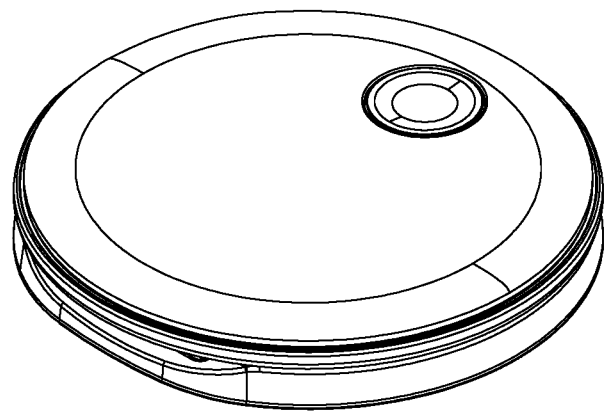
FIG. 1 is a perspective view of a supporting attachment according to some exemplary embodiments.

The aforementioned and other technical features, characteristics and effects of the present disclosure may be clearly presented by the detailed description of exemplary embodiments together with the attached figures. In addition, in the following embodiments, the same or similar components will use the same or similar reference numerals.

In addition, the methods, processes and steps disclosed by the embodiments are only illustrative and not intended to limit. Therefore, a person skilled in the art can appropriately increase, omit, modify or execute each method, process or step alone without departing from the spirit and the scope of the invention, unless the change results in timing or technical inconsistencies. Besides, the orders of each method, process or step can also be altered or adjusted.

Figure 2:
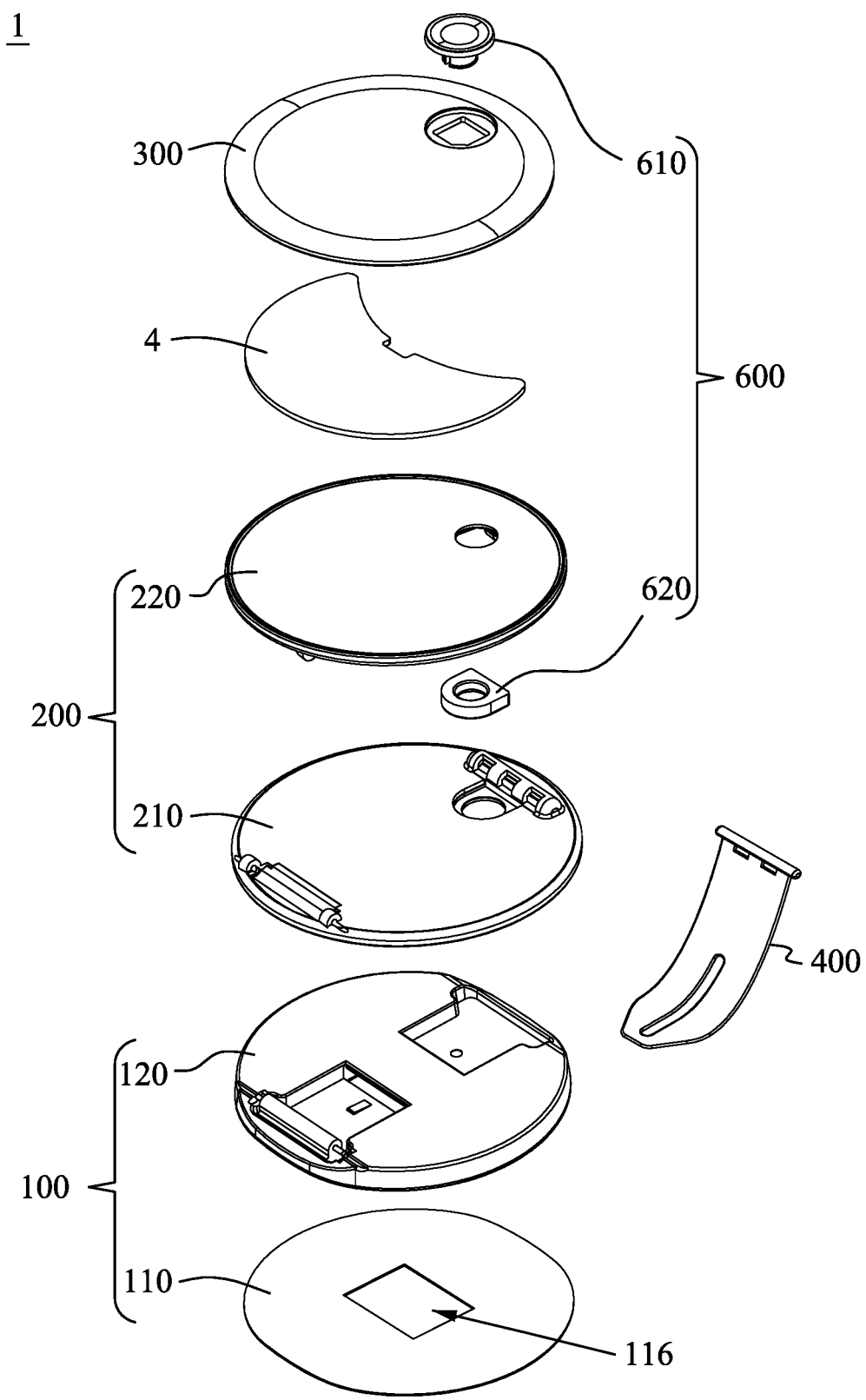
FIG. 2 is an exploded view of the supporting attachment in FIG. 1.

Refer to FIG. 1 and FIG. 2. The supporting attachment 1 in the embodiments is adapted for a mobile electronic device or a mobile electronic device casing. The mobile electronic device can be any electronic product such as smartphone, tablet, personal digital assistant or e-reader, and the mobile electronic device casing can be a case or a housing with a back shell for accommodating the electronic product. On the other hand, the supporting attachment 1 includes a joining member 100, a first supporting member 200, at least one expanding member 400 and a second supporting member 300. The joining member 100 is adapted to be attached on the mobile electronic device or the mobile electronic device casing. The expanding member 400 is connected between the joining member 100 and the first supporting member 200, and the first supporting member 200 can be selectively located in a retracted position or an expanded position relative to the joining member 100 through the expanding member 400. The second supporting member 300 is pivoted to the first supporting member 200 and adapted to abut against a supporting surface, which can be a desk or a floor for placing the mobile electronic device, but it is not limited by the invention. For the ease of illustration, in the following description, the perspective from the joining member 100 towards the second supporting member 300 will be referred to as the first perspective, and the perspective from the second supporting member 300 towards the joining member 100 will be referred to as the second perspective. Alternatively, the first perspective and the second perspective can be respectively understood as the directions from bottom to top and from top to bottom in FIG. 2.

Figure 3:
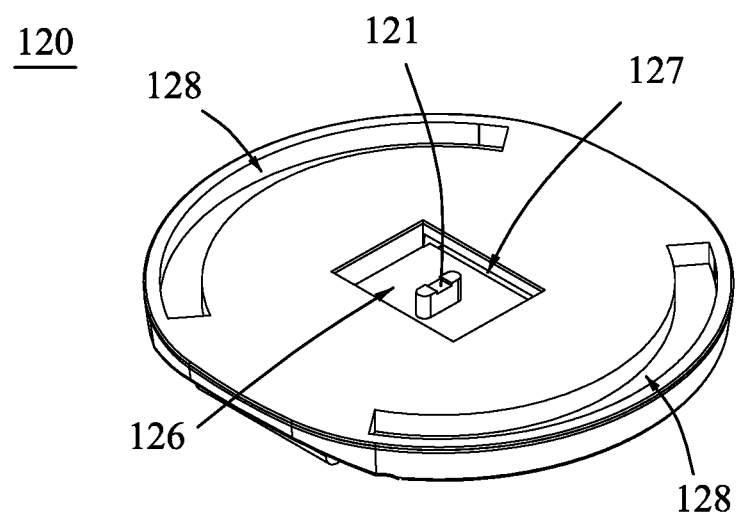
FIG. 3 is a perspective view of the base portion in FIG. 2, as viewed from a first perspective.
Figure 4:
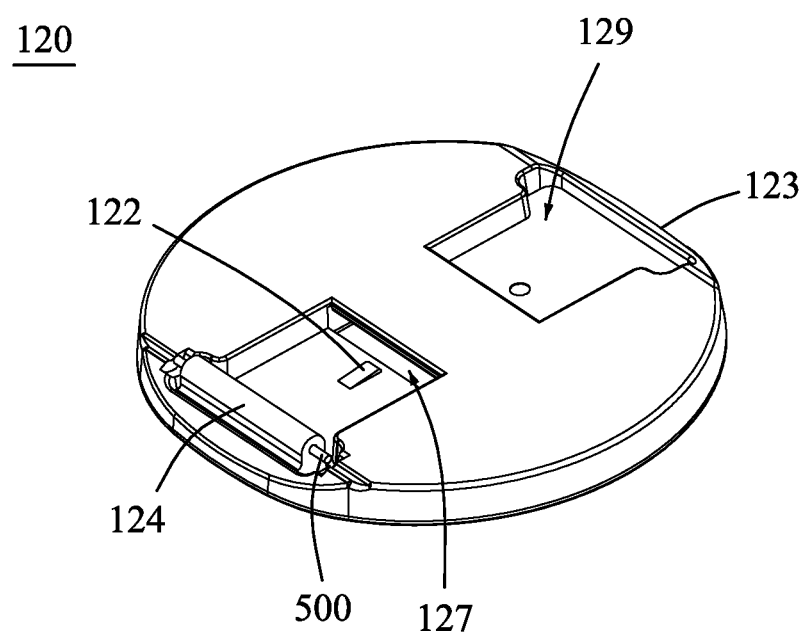
FIG. 4 is another perspective view of the base portion in FIG. 2, as viewed from a second perspective.

Refer to FIGS. 2 to 4. Specifically, the supporting attachment 1 can be attached to the mobile electronic device or the mobile electronic device casing to act as a part of supporting mechanisms through the joining member 100 and provide multiple view angles or collocating types of the mobile electronic device when the mobile electronic device is placed on the supporting surface. As shown in FIG. 2, the joining member 100 may include a joining portion 110 and a base portion 120. The joining portion 110 is exemplary to be a circular patch made of polycarbonate (PC) and formed with an opening 116. Besides, as shown in FIG. 2, the size and shape of the base portion 120 are substantially equal to the joining portion 110, and the surface of the base portion 120 abutting against the joining portion 110 is formed with a concaved portion 126. The size, shape and location of the concaved portion 126 are corresponding to the opening 116.

On the other hand, the base portion 120 may include a limiting portion 121 configured to engage with the expanding member 400. The limiting portion 121 is exemplary to be a protrusion formed on a bottom wall of the concaved portion 126. The base portion 120 is formed with a communicating slot 127 on a side wall of the concaved portion 126, and the communicating slot 127 communicates with the concaved portion 126. By the arrangement, when the joining member 100 and the expanding member 400 are assembled, the expanding member 400 can pass through the concaved portion 126 from a side of the base portion 120 away from the joining portion 110 via the communicating slot 127. Furthermore, by the engagement between the expanding member 400 and the limiting portion 121, the displacement of the expanding member 400 is limited, and the expanding member 400 is prevented from completely detaching from the joining member 100, so the first supporting member 200 is retained in the expanded position.

In some embodiments, the supporting attachment 1 may further include a magnetic member or a magneto receiving member (not shown). The magnetic member can be a permanent magnet or an electromagnet capable of actively generating a magnetic field, and the magneto receiving member can be metals chosen from iron, cobalt or nickel, or alloys or parts fabricated from the above substances capable of being magnetically attracted by an external magnetic field. In the embodiments, the supporting attachment 1 is exemplary to include two arc-shaped magnets corresponding to a MAGSAFE interface disposed on the backside of the mobile electronic device. Thereby, the joining member 100 is able to be selectively magnetically connected to the mobile electronic device through the magnetic member or the magneto receiving member, and can be detached from the mobile electronic device when the supporting attachment 1 is not in used. Consequently, the ease of use of the supporting attachment 1 is significantly enhanced.

In addition, as shown in FIG. 3, the base portion 120 is formed with magnet accommodating portions 128 whose shape and quantity are corresponding to the magnetic members or the magneto receiving members. In the embodiments, the magnet accommodating portions 128 are two, disposed on a periphery of the base portion 120 and configured to accommodate the magnetic members or the magneto receiving members. By the arrangement, the magnetic members or the magneto receiving members adapted to be magnetically connected to the mobile electronic device can be disposed in the magnet accommodating portions 128. Moreover, after the assembly of the joining portion 110 and the base portion 120 is completed, openings of the magnet accommodating portions 128 can be covered by the joining portion 110. Therefore, not only the entire volume of the joining member 100 with the magnetic members or the magneto receiving members can be minimized, but the magnetic members or the magneto receiving members are blocked by the joining portion 110 without being detached from the magnet accommodating portion 128 due to magnetic attraction.

On the other hand, as shown in FIG. 4, the base portion 120 may be formed with an expanding member accommodating portion 129 on a side away from the joining portion 110 for accommodating the expanding member 400 when the first supporting member 200 is located in the retracted position (as shown in FIG. 2). In the embodiments, the supporting attachment 1 further includes a first pivoting member 500, and the first supporting member 200 is pivoted to the joining member 100 through the first pivoting member 500. Specifically, the base portion 120 may include a pivoting portion 124 that is exemplary to be disposed a side edge of the base portion 120, and the first pivoting member 500 passes through the pivoting portion 124. Thereby, an end of the first supporting member 200 can be selectively moved away from or towards the joining member 100 through the expanding member 400 with another end of the first supporting member 200 pivoted to the joining member 100, which allows the first supporting member 200 to move between the expanded position and the retracted position.

In some embodiments, the base portion 120 further includes an abutting portion 122, and the abutting portion 122 and the expanding member accommodating portion 129 are respectively disposed on opposite sides of a surface of the base portion 120. The abutting portion 122 is exemplary to be a wedge-shaped protrusion in the embodiments for abutting against the expanding member 400 to hold the expanding member 400.

To facilitate the separation of the first supporting member 200 and the joining member 100 in the retracted state, a tilted portion 123 is formed on a periphery of the base portion 120 in the embodiments. The tilted portion 123 can be an incline, and a clearance is formed between an end of the tilted portion 123 and the first supporting member 200. Thereby, users are allowed to pry open the first supporting member 200 through the clearance between the tilted portion 123 and the first supporting member 200, and the convenience in using the supporting attachment 1 is enhanced.

Figure 5:
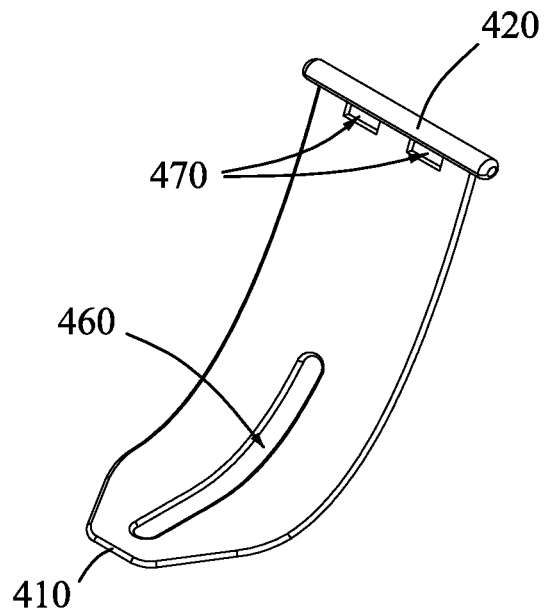
FIG. 5 is a perspective view of the expanding member in FIG. 2.

Refer to FIG. 5. Specifically, the expanding member 400, for example, is a slender-shaped strip made of recycled polyethylene terephthalate (rPET) and includes a first end 410 and a second end 420. The first end 410 passes through the concaved portion 126, the communicating slot 127 and the expanding member accommodating portion 129 of the joining member 100. The second end 420 is connected to the first supporting member 200 and is exemplary to be pivoted to the first supporting member 200 in the embodiments, which realize the expansion and retraction of the first supporting member 200 relative to the joining member 100.

Specifically, the expanding member 400 is formed with a limiting feature 460 near the first end 410. The limiting feature 460, for example, can be a penetrated groove, and the limiting portion 121 of the joining member 100 is engaged with the limiting feature 460. When the first supporting member 200 moves during the process of expansion or retraction, the limiting portion 121 remains sliding within the limiting feature 460, thus restricting the movement and direction of the expanding member 400. However, in other embodiments, the limiting portion 121 can be designed as a groove, and the limiting feature 460 can be designed as a protrusion sliding within the groove to achieve the same effect. The invention is not limited thereto.

In addition, as shown in FIG. 5, the expanding member 400 is formed with at least one through-hole 470 near the second end 420. In the embodiments, the through-holes 470, for example, may be two and configured to engage with the first supporting member 200 to enhance the stability of connection.

Figure 6:
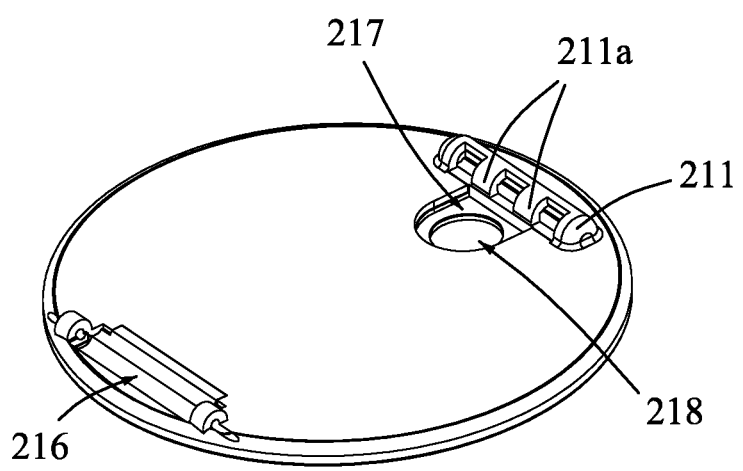
FIG. 6 is a perspective view of the connecting portion in FIG. 2, as viewed from the first perspective.

Refer to FIG. 2 and FIG. 6. Specifically, the first supporting member 200 may include a connecting portion 210 and a mounting portion 220. The mounting portion 220, whose size is slightly larger than the connecting portion 210, is configured to mount the second supporting member 300. The connecting portion 210 is engaged to the surface of the mounting portion 220 adjacent to the joining member 100 and configured to be connected with the joining member 100. As shown in FIG. 6, the connecting portion 210 may include an expanding member pivoting portion 211, and the second end 420 of the expanding member 400 is pivoted to the connecting portion 210 through the expanding member pivoting portion 211. In addition, the expanding member pivoting portion 211 further includes at least one retaining feature 211a. The retaining feature 211a is, for example, a hook corresponding to the through-hole 470, and capable of being engaged with the through-hole 470 to make the expanding member 400 and the first supporting member 200 joined stably.

On the other hand, a pivoting member accommodating slot 216 may be formed on the connecting portion 210 and adapted to accommodate the first pivoting member 500. In other words, when the first supporting member 200 is pivoted to the joining member 100 through the first pivoting member 500, the first pivoting member 500 passes through the pivoting portion 124 and the pivoting member accommodating slot 216 simultaneously. Moreover, since the expanding member pivoting portion 211 is separated from the pivoting member accommodating slot 216, the first pivoting member 500 is also separated from the second end 420, and an expanded space with sufficient size can be formed as the first supporting member 200 is moved through the expanding member 400. The stability of the mobile electronic device is thus enhanced when supported.

As shown in FIG. 2 and FIG. 6, the supporting attachment 1 may further include a second pivoting member 600, and the second supporting member 300 is pivoted to the first supporting member 200 through the second pivoting member 600. Specifically, the second pivoting member 600 includes a pivotal shaft portion 610 and a pivotal connecting portion 620. The pivotal shaft portion 610 is exemplary to be a shaft co-rotating with the second supporting member 300, and the pivotal connecting portion 620 is, for example, a gasket or a nut securing the pivotal shaft portion 610 onto the first supporting member 200. On the other hand, as shown in FIG. 6, the connecting portion 210 is further formed with a pivotal connecting portion accommodating slot 217 and a pivotal shaft portion accommodating slot 218. The shape and size of the pivotal connecting portion accommodating slot 217 are corresponding to the pivotal connecting portion 620, the shape and size of the pivotal shaft portion accommodating slot 218 are corresponding to the pivotal shaft portion 610, and the pivotal connecting portion accommodating slot 217 communicates with the pivotal shaft portion accommodating slot 218. By the arrangement, when the second supporting member 300 and the pivotal shaft portion 610 rotate relative to the first supporting member 200, the pivotal connecting portion 620 is restricted by the pivotal connecting portion accommodating slot 217, and the rotation of the second pivoting member 600 can be guaranteed to be realized only through the relative rotation between the pivotal shaft portion 610 and the pivotal connecting portion 620, without an associated rotation of the first supporting member 200.

Figure 7:
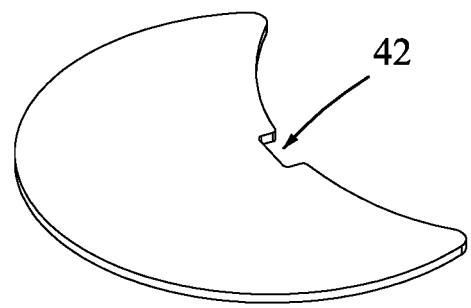
FIG. 7 is a perspective view of the wireless communication component in FIG. 2.
Figure 8:
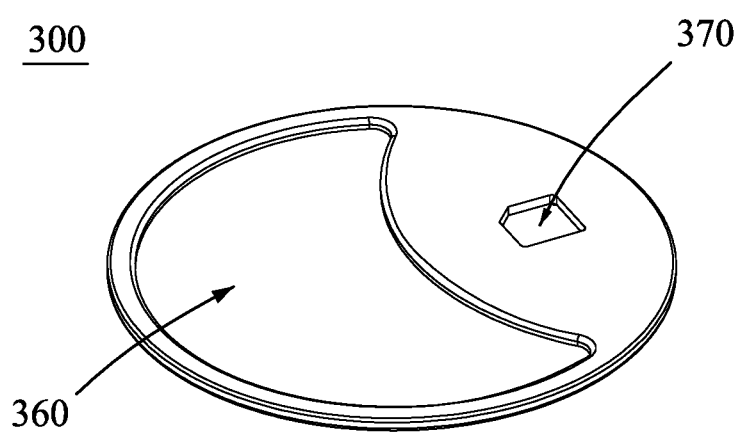
FIG. 8 is a perspective view of the second supporting member in FIG. 2, as viewed from the first perspective.
Figure 9:
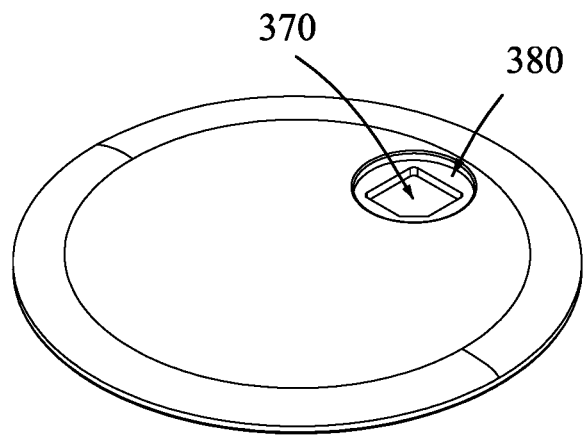
FIG. 9 is another perspective view of the second supporting member in FIG. 2, as viewed from the second perspective.

Refer to FIG. 7 to FIG. 9. Specifically, the supporting attachment 1 in the embodiments has a function of accommodating a wireless communication component 4 therein and being combined to the mobile electronic device. The wireless communication component 4 may be a RFID component such as EasyCard, access card or electronic car key, or a NFC component integrating the functionality of Apple Pay or Google Pay, which is not limited by the invention. As shown in FIG. 8, the second supporting member 300 is formed with a communication component accommodating portion 360 which is exemplary to be a semicircular groove with size and shape corresponding to the wireless communication component 4. Users can dispose the wireless communication component 4 into the communication component accommodating portion 360 to obtain commuting, access control or mobile payment functions without carrying an extra component through the supporting attachment 1 accommodating the wireless communication component 4 according to actual needs. However, in other embodiments, the communication component accommodating portion 360 can be formed on the first supporting member 200 or even the joining member 100. The invention does not impose any limitations on this.

Moreover, as shown in FIG. 7, one of the communication component accommodating portion 360 and the wireless communication component 4 is formed with an escaping portion. In the embodiments, the escaping portion 42 is exemplary to be a concaved portion and formed on the wireless communication component 4. Thereby, when the wireless communication component 4 is engaged in the communication component accommodating portion 360, and if users need to remove or replace the wireless communication component 4, it can be easy to take the wireless communication component 4 out through the escaping portion 42, thus enhancing convenience in the usage.

As shown in FIG. 9, in some embodiments, a surface of the second supporting member 300 away from the first supporting member 200 is glossy. The way to obtain the glossy surface is, for example, by uniformly planting a silver coating or embedding a mirror on a surface of the second supporting member 300. By the arrangement, when the supporting attachment 1 is attached on the mobile electronic device through the joining member 100, users can use the glossy surface on the second supporting member 300 for activities such as touch-ups or grooming, thus enhancing the functionality of the supporting attachment 1.

In some embodiments, the supporting attachment 1 may further include a decorating portion (not shown). The decorating portion, for example, may be chosen from a material like silicone and disposed on a surface of the second supporting member 300 away from the first supporting member 200. Since silicone is highly malleable and can be easily dyed, the printing of attractive cartoon patterns or specific designs on the decorating portion is allowed to enhance the aesthetic appeal of the supporting attachment 1.

On the other hand, the pivotal shaft portion 610 of the second pivoting member 600 extends parallel to a normal to adjoining surfaces of the first supporting member 200 and the second supporting member 300. In other words, the second supporting member 300 rotates around an axis perpendicular to the first supporting member 200. This configuration is advantageous in preventing the supporting attachment 1 from accidentally collapsing due to applied force during use. Further details regarding the underlying principle will be described in the following contents.

Figure 10:
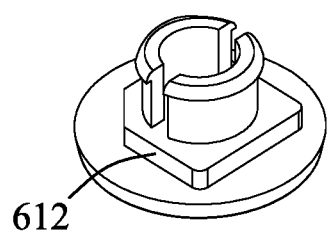
FIG. 10 is a perspective view of the pivotal shaft portion in FIG. 2, as viewed from the first perspective.

Refer to FIG. 8 to FIG. 10. In the embodiments, the pivotal shaft portion 610 includes a positioning portion 612, and the second supporting member 300 is formed with a positioning feature 370. The positioning feature 370 is, for example, a non-circular through-hole with size and shape corresponding to the positioning portion 612, and the positioning portion 612 is engaged with the positioning feature 370. Thereby, when the second supporting member 300 rotates with respect to the first supporting member 200, the pivotal shaft portion 610 will rotates synchronously with the second supporting member 300 by the engagement between the positioning feature 370 and the positioning portion 612, which prevents components from slipping and wearing against each other.

Besides, the second supporting member 300 may further be formed with a pivoting portion accommodating portion 380. The pivoting portion accommodating portion 380 is exemplary to be a concaved portion with a size slightly greater than the positioning feature 370 and communicate therewith. By the arrangement, when the pivotal shaft portion 610 is inserted into the second supporting member 300, the upper surface of the pivotal shaft portion 610 can be aligned with or slightly lower than the upper surface of the second supporting member 300, and a more refined appearance of the supporting attachment 1 is obtained.

Figure 11:
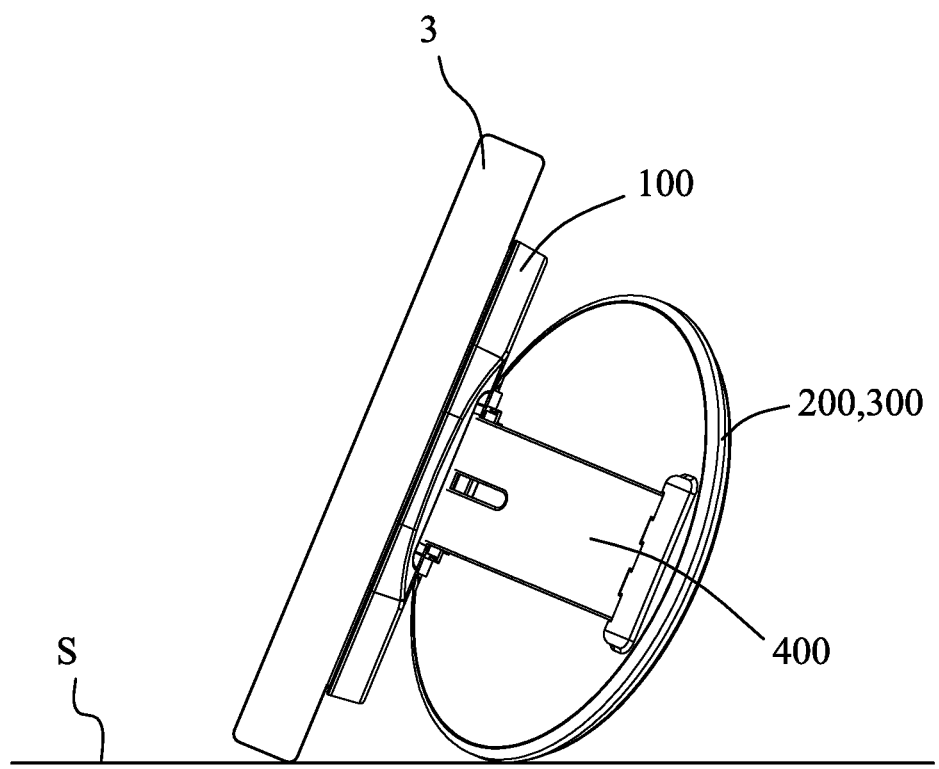
FIG. 11 is a perspective view of the supporting attachment in FIG. 1 when cooperating with a mobile electronic device.
Figure 12:
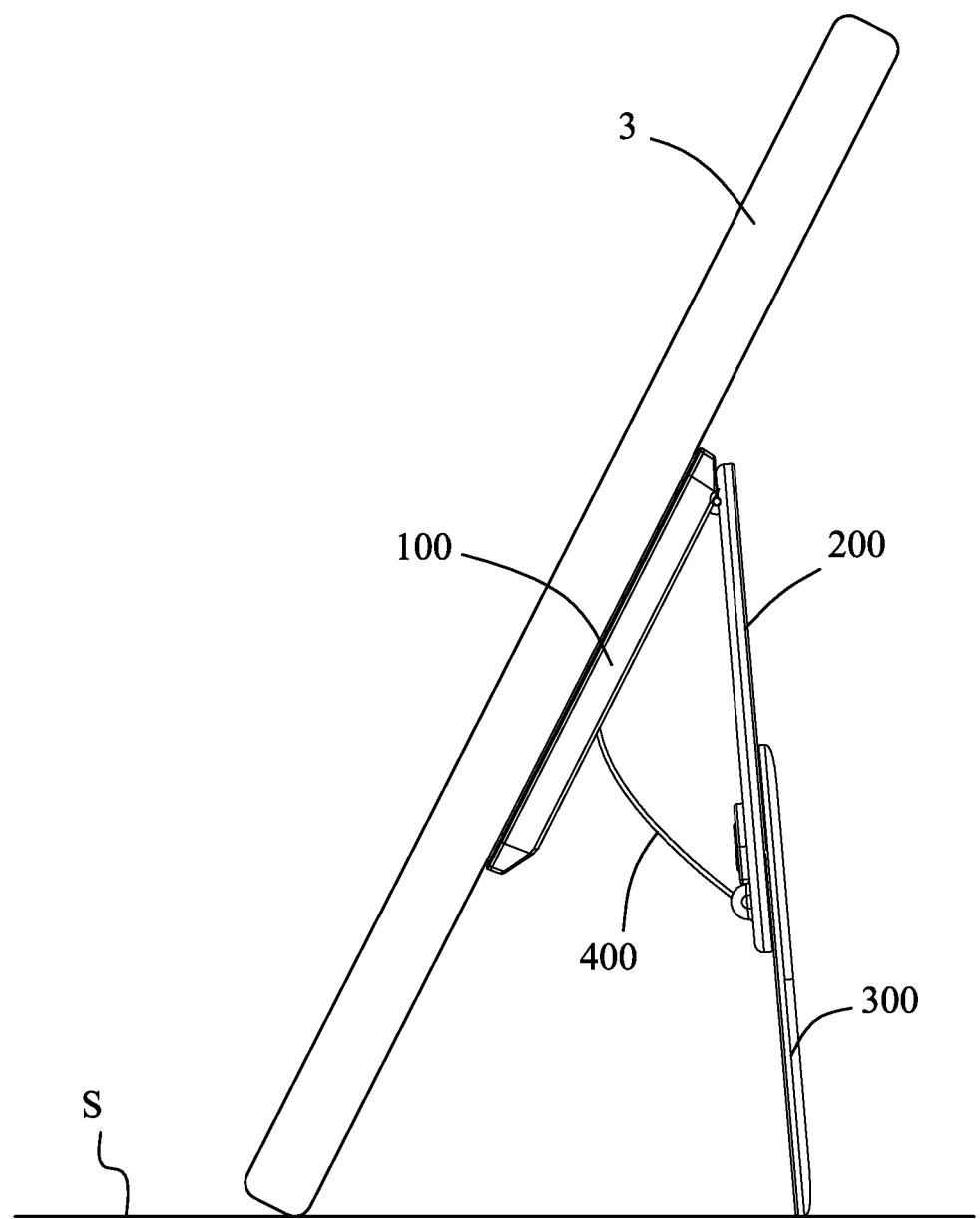
FIG. 12 is another perspective view of the supporting attachment in FIG. 1 when cooperating with the mobile electronic device.
Figure 13:
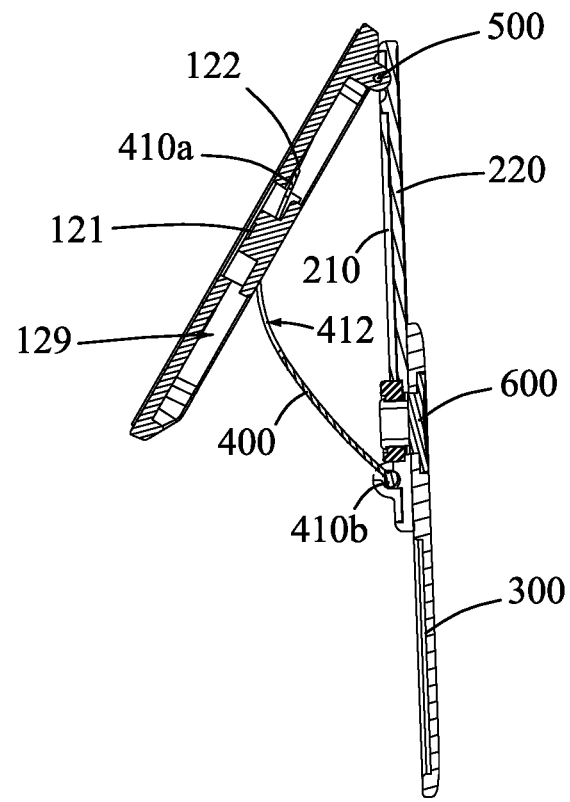
FIG. 13 is a cross-sectional view of the supporting attachment in FIG. 12.

Refer to FIG. 11 to FIG. 13. The operational principles of the supporting attachment 1 in the embodiments will be illustrated with detailed description as following. As shown in FIG. 11 and FIG. 12, the joining member 100 is adapted to be attached on a backside of a mobile electronic device 3. The mobile electronic device 3 is exemplary to be a smartphone, the diameter of the joining member 100 is less than the width of the mobile electronic device 3 and one third of the length of the mobile electronic device 3. Specifically, the joining member 100 is adapted to be attached on a central portion of the backside of the mobile electronic device 3, and an orthographic projection area of the joining member 100 is less than one third of an area of the backside. This configuration benefits reducing the overall volume of the supporting attachment 1 and makes it compact and less bulking during use. However, in other embodiments, the joining member 100 may be also attached on the backside of a case accommodating the mobile electronic device 3. The invention does not impose any limitations on this.

On the other hand, as shown in FIG. 11 and FIG. 12, when the first supporting member 200 is moved from a retracted position where the first supporting member 200 coincides with the joining member 100 to an expanded position where the first supporting member 200 is away from the joining member 100 through the expanding member 400, the mobile electronic device 3 can abut against the supporting surface with its own portion, the first supporting member 200 and/or the second supporting member 300, together. Specifically, as shown in FIG. 11, when the second supporting member 300 is located in a first pivoting position where the second supporting member 300 coincides with the first supporting member 200, the mobile electronic device 3 can abut against the supporting surface S through its long edge, and the first supporting member 200 and/or the second supporting member 300 can abut against the supporting surface S through their expanded side edges. On the other hand, as shown in FIG. 12, when the second supporting member 300 rotates to a second pivoting position where the second supporting member 300 is away from the first supporting member 200, the mobile electronic device 3 can abut against the supporting surface S through its short edge, and the second supporting member 300 can abut against the supporting surface S through its bottom edge after pivoting. By the arrangement, users can support the mobile electronic device 3 in different modes through rotations of the first supporting member 200 and the second supporting member 300, thereby enhancing flexibility in the usage.

In addition, as shown in FIG. 13, when the first supporting member 200 moves to the expanded position, the second end 420 of the expanding member 400 will be driven, and the expanding member 400 is moved synchronously with the engagement with the limiting portion 121. Preferably, the distance between the terminal of the limiting feature 460 and the first end 410 is substantially equal to the distance between the end of the limiting portion 121 and a side surface of the abutting portion 122 for contacting. Thereby, when the expanding member 400 moves to make the terminal of the limiting feature 460 abut against the end of the limiting portion 121, the first end 410 also abuts against the side surface of the abutting portion 122 at the same time, which maintains the expanding member 400 in the current position. Therefore, the expanding member 400 is blocked from being retracted into the expanding member accommodating portion 129 by the abutting portion 122, and an accidental collapsing of the first supporting member 200 is avoided. On the other hand, due to a slight difference in height between the side surface of the abutting portion 122 and the bottom wall of the expanding member accommodating portion 129, when users want to retract the first supporting member 200 to the retracted position, they only needs to apply a little pressure on the surface of the first supporting member 200, which will cause the first end 410 to slide past the side surface of the abutting portion 122, allowing the first supporting member 200 and the expanding member 400 to return to their original positions, so the first supporting member 200 can be retracted.

On the other hand, as shown in FIG. 12 and FIG. 13, the second supporting member 300 can rotate relative to the first supporting member 200 and act as a supporting point for the mobile electronic device 3 to stand on the supporting surface S. Since the distance between the supporting point formed by the second supporting member 300 and the first pivoting member 500 is larger than the distance between the supporting point formed by the first supporting member 200 and the first pivoting member 500, not only the mobile electronic device 3 and the second supporting member 300 are respectively located at two opposite sides of the normal plane of the supporting surface S, but the elevation angle formed by the mobile electronic device 3 becomes greater through the second supporting member 300 after pivoting. Therefore, the vertical component (i.e., the component in the direction of retraction) of the weight of the mobile electronic device 3 applied to the joining member 100 is reduced, and the stability of the support is improved. The effect of protecting the mobile electronic device 3 from potential damage is achieved.

Figure 14:
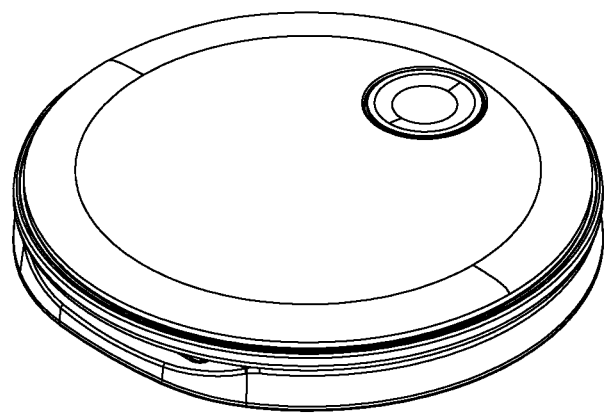
FIG. 14 is a perspective view of a supporting attachment according to some other exemplary embodiments.
Figure 15:
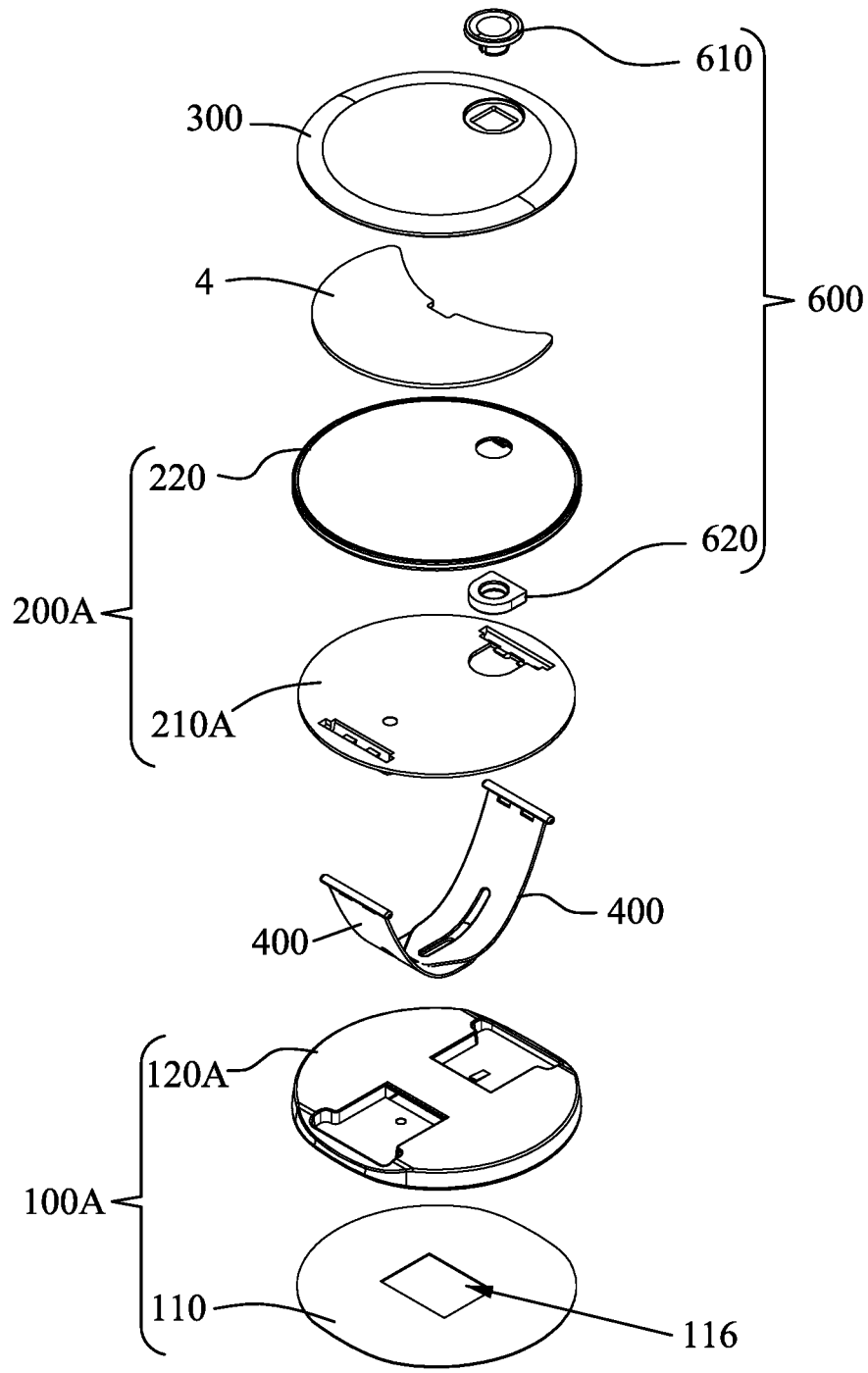
FIG. 15 is an exploded view of the supporting attachment in FIG. 14.

Refer to FIG. 14 and FIG. 15. The supporting attachment 1A is substantially similar to the supporting attachment 1 in the previous embodiments. The main difference between them is that the supporting attachment 1A includes two expanding member 400, and the supporting attachment 1A does not have the first pivoting member 500.

Figure 16:
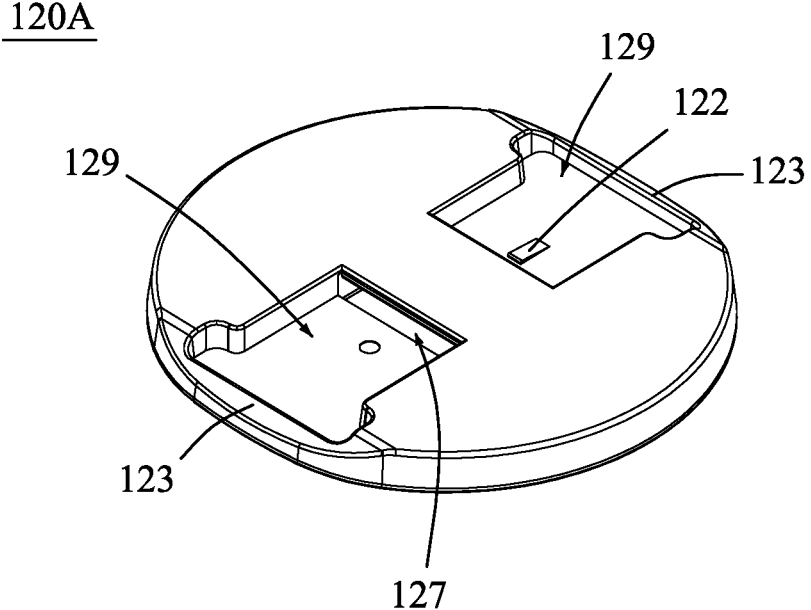
FIG. 16 is a perspective view of the base portion in FIG. 15, as viewed from the second perspective.
Figure 17:
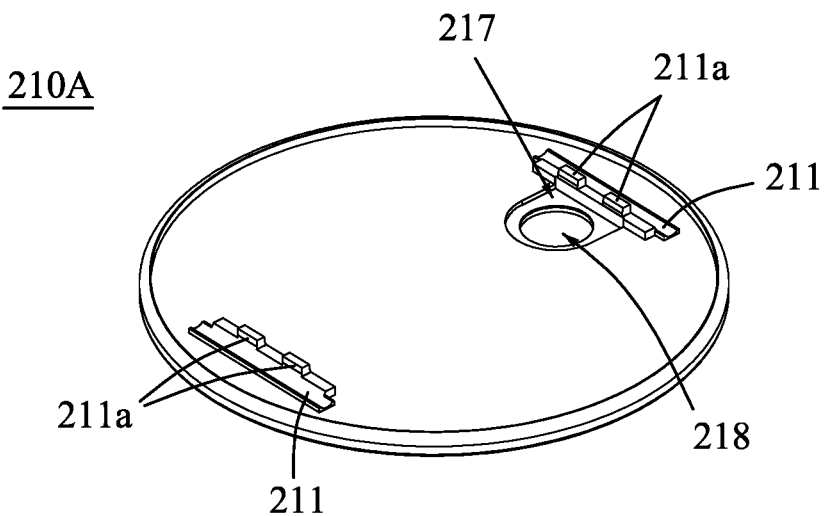
FIG. 17 is a perspective view of the connecting portion in FIG. 15, as viewed from the first perspective.

Refer to FIG. 15 to 17. Specifically, two expanding members 400 of the supporting attachment 1A are symmetrically disposed relative to the first supporting member 200A and overlaps each other by a portion. As shown in FIG. 15 and FIG. 16, the expanding member 400 corresponding to the abutting portion 122 is preferably disposed between the base portion 120A of the joining member 100A and the other expanding member 400, and both of the limiting features 460 of the expanding members 400 are engaged with the limiting portion 121. Therefore, when the first supporting member 200A moves to the expanded position, the first end 410 of the lower expanding member 400 in FIG. 15 will abut against the abutting portion 122, and the first end 410 of the upper expanding member 400 in FIG. 15 will abut against the lower expanding member 400. Thereby, all expanding members 400 are maintained in the expanded position through disposing a single abutting portion 122, and the moving distance of the upper expanding member 400 is limited by the communicating slot 127 and the limiting feature 460, preventing the expanding members 400 from being detached from the joining member 100A.

On the other hand, since the supporting attachment 1A does not have the first pivoting member 500, the original position where the pivoting portion 124 is disposed of the base portion 120A can be changed to the tilted portion 123, and the number of the expanding member accommodating portions 129 is increased to two, corresponding to the number of the expanding members 400. In addition, the original position where the pivoting member accommodating slot 216 is disposed of the connecting portion 210A can also be changed to the expanding member pivoting portion 211, so that both of the expanding members 400 are configured with one end passing through the joining member 100A and the another end pivoted to the first supporting member 200A. However, in other embodiments, the number of the expanding members 400 may also be three, four, or even more, and these expanding members 400 are not necessarily symmetrically disposed relative to the first supporting member 200A. The present invention does not impose any limitations on this.

Figure 18:
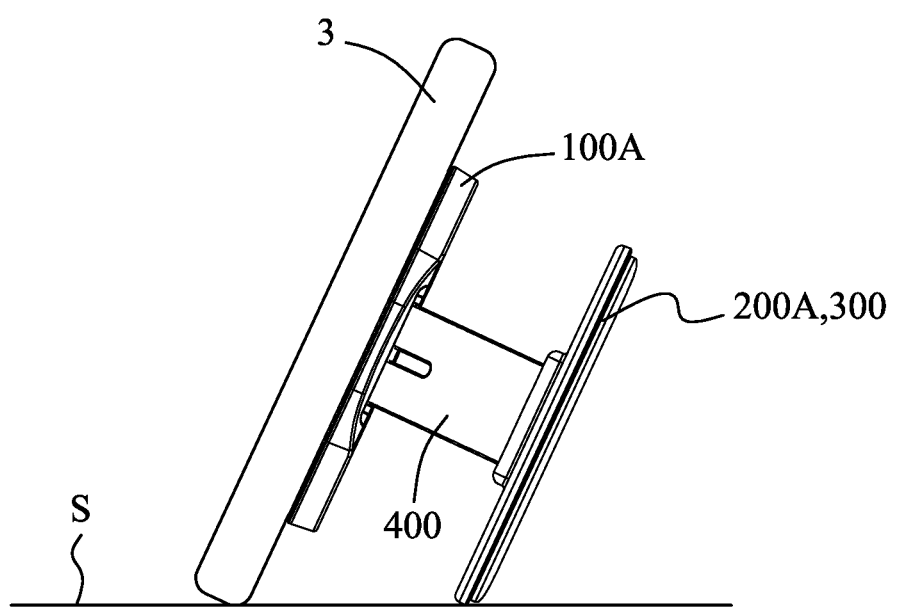
FIG. 18 is a perspective view of the supporting attachment in FIG. 14 when cooperating with a mobile electronic device.
Figure 19:
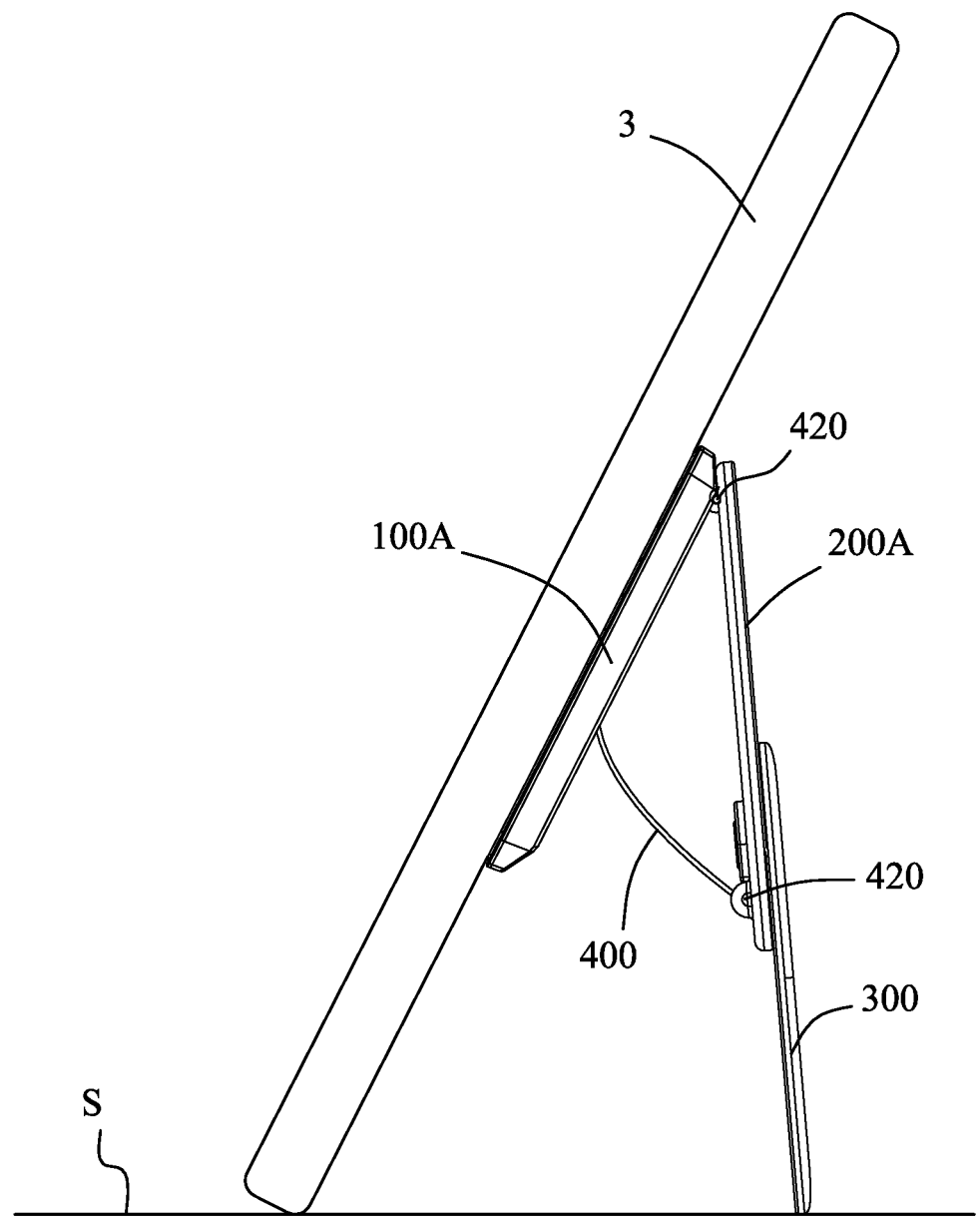
FIG. 19 is another perspective view of the supporting attachment in FIG. 14 when cooperating with the mobile electronic device.

Refer to FIG. 18 and FIG. 19. Specifically, when the first supporting member 200A moves to the expanded position shown in figure, both of the second ends 420 of the expanding members 400 are away from the joining member 100A. In addition, since these expanding members 400 are components with an identical specification, the first supporting member 200 in the expanded position is substantially parallel to the joining member 100A. By the arrangement, even if the second supporting member 300 does not rotate to the second pivoting position, a greater distance can be formed between the first supporting member 200A located in the expanded position and the joining member 100A than the supporting attachment 1. Not only is the mobile electronic device 3 more stable when it is positioned with its long edge abutting against the supporting surface S, as shown in FIG. 18, but it is also convenient and secure for users to pick up the mobile electronic device 3. Users can insert their fingers into the space enclosed by the joining member 100A, the first supporting member 200A and the expanding member 400.

It is worth mentioning that the expanding members 400 share the same specification in the embodiments, but the present invention is not limited thereto. In other embodiments, expanding members 400 with different sizes can be disposed on different phases of the first supporting member 200A to achieve obliquely expansion of the first supporting member 200A relative to the joining member 100A according to actual supporting modes.

Figure 20:
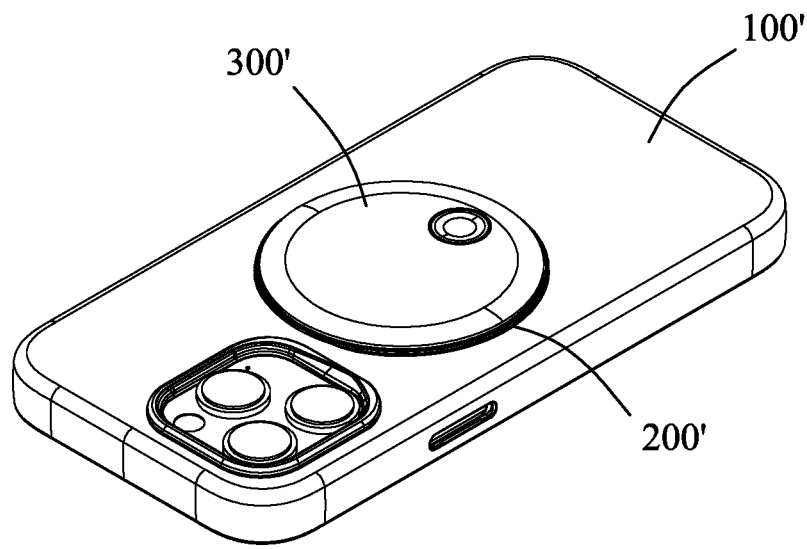
FIG. 20 is a perspective view of a mobile electronic device casing according to some exemplary embodiments.

Refer to FIG. 20. The mobile electronic device casing 2 in the embodiments is adapted to a mobile electronic device 3. The mobile electronic device casing 2 is exemplary to be a phone case, while the mobile electronic device 3 is exemplary to be a smartphone, but the present invention does not impose any limitations on this. Specifically, the mobile electronic device casing 2 may include a main body 100', a first supporting member 200', at least one expanding member 400' and a second supporting member 300'. The main body 100' is adapted to accommodate the mobile electronic device 3. The expanding member 400' is connected between the main body 100' and the first supporting member 200', and the first supporting member 200' is selectively located in a retracted position or an expanded position relative to the main body 100' through the expanding member 400'. The second supporting member 300' is pivoted to the first supporting member 200' and adapted to abut against a supporting surface.

Figure 21:
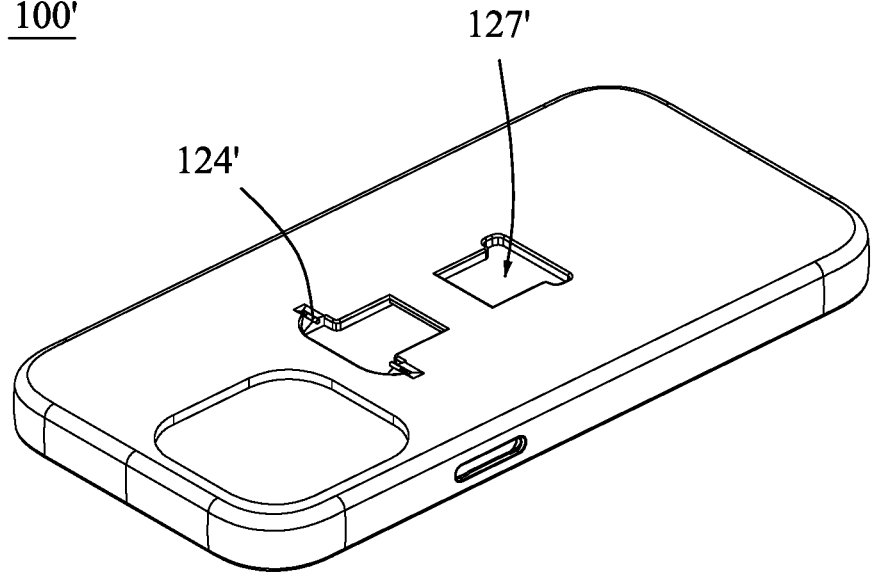
FIG. 21 is a perspective view of the main body in FIG. 20.
Figure 22:
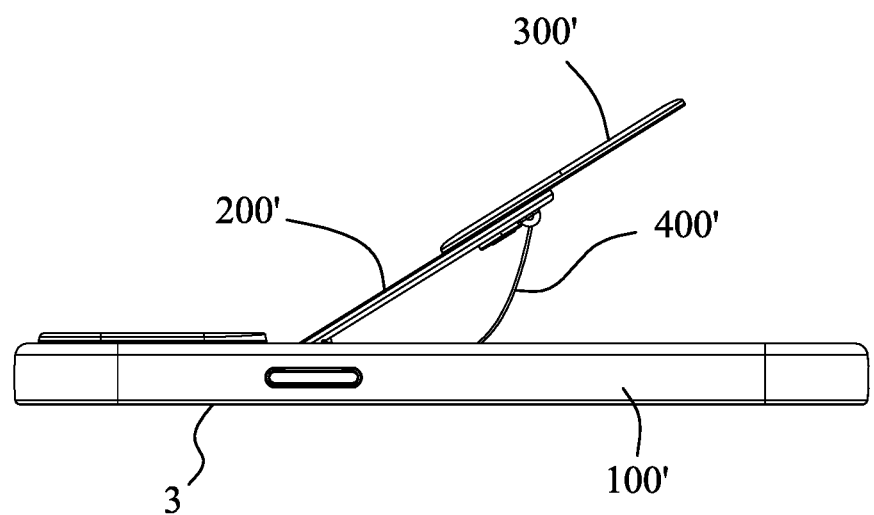
FIG. 22 is a side view of the mobile electronic device casing in FIG. 20 when the first supporting member is located in the expanded position.

Refer to FIG. 21 and FIG. 22. Specifically, in comparison to the supporting attachment 1 and the supporting attachment 1A that are selectively attached on the backside of the mobile electronic device 3 or the mobile electronic device casing, the mobile electronic device casing 2 in the embodiments is integrated with the mobile electronic device 3 in a housing manner, which bypasses frequent processes for users to remove or attach the supporting attachment 1 or the supporting attachment 1A, and also prevents the joining member from being detached from the mobile electronic device 3 to cause the mobile electronic device 3 to collide or be damaged. Besides, the mobile electronic device casing 2 further provides more comprehensive protection to the mobile electronic device 3 for the sides and bottom.

Similar to the supporting attachment 1, the main body 100' may be formed with a pivoting portion 124' and a communicating slot 127'. The first supporting member 200' can be pivoted to the pivoting portion 124' through the first pivoting member 500, and the expanding member 400' pivoted on the first supporting member 200' passes through the communicating slot 127'. In addition, a limiting portion configured to engage with the limiting feature 460 of the expanding member 400' may be formed on the main body 100'. The limiting portion is, for example, disposed inside the space of the main body 100' to accommodate the mobile electronic device 3. Thereby, when users want to place the mobile electronic device 3 on the supporting surface in different supporting modes, the first supporting member 200' can be expanded to the expanded position, and the second supporting member 300' can be selectively rotated to the second pivoting position relative to the first supporting member 200', as shown in FIG. 22. Besides, the expanding member 400' can be limited by the limiting portion without being detached from the main body 100'. Due to the similarity in operational principles with the supporting attachment 1, the detailed description is omitted.

Figure 23:
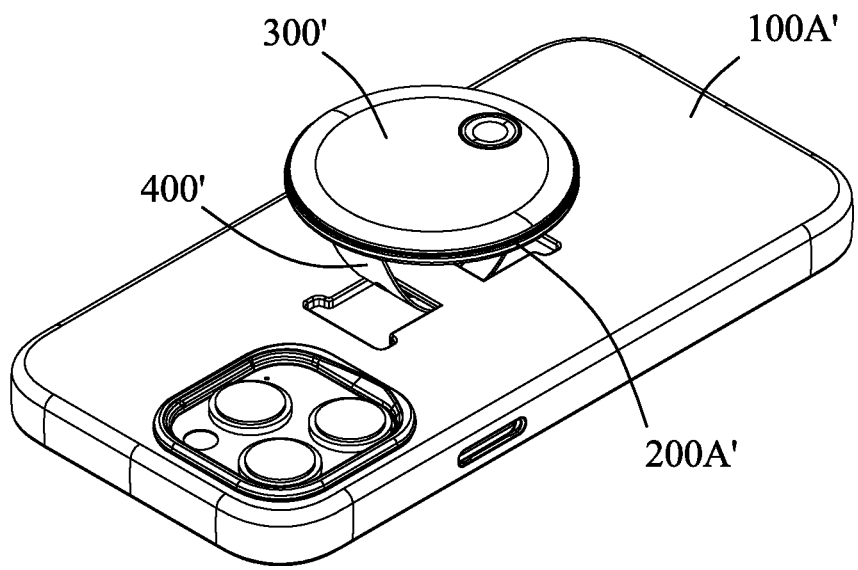
FIG. 23 is a perspective view of a mobile electronic device casing according to some other exemplary embodiments.

Refer to FIG. 23. The mobile electronic device casing 2A is substantially similar to the mobile electronic device casing 2 in the previous embodiments. The main difference between them is that the mobile electronic device casing 2A includes two expanding members 400', and the mobile electronic device casing 2A does not have the first pivoting member 500.

Figure 24:
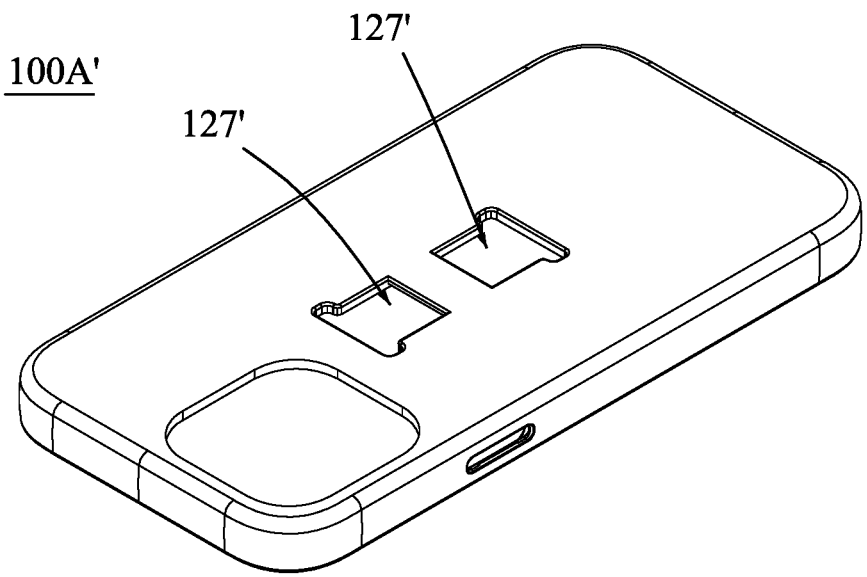
FIG. 24 is a perspective view of the main body in FIG. 23.
Figure 25:
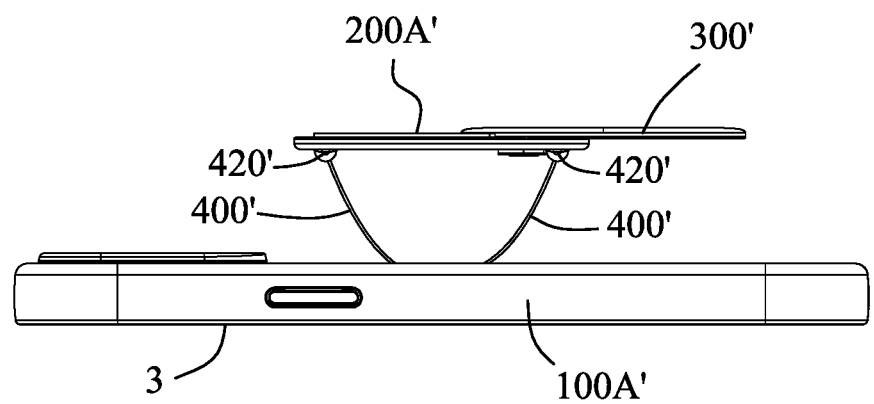
FIG. 25 is a side view of the mobile electronic device casing in FIG. 23 when the first supporting member is located in the expanded position.

Refer to FIG. 24 and FIG. 25. Specifically, similar to the supporting attachment 1A, the main body 100A' does not have the pivoting portion 124' but is formed with two communicating slots 127'. The expanding members 400' pass through the communicating slots 127' and overlap with each other. Besides, limiting portions configured to engage with the limiting features 460 of the expanding members 400' may be formed on the main body 100A'. The limiting portions are, for example, disposed inside the space of the main body 100A' to accommodate the mobile electronic device 3. By the arrangement, when users need to place the mobile electronic device 3 in different supporting modes or want to pick up the mobile electronic device casing 2A in a way other than gripping, the first supporting member 200' can be pried open through the tilted portion formed on the first supporting member 200A' to cause the second ends 420 of all the expanding members 400 to be away from the main body 100A', as shown in FIG. 25. Besides, the second supporting member 300' can be selectively rotated to the second pivoting position to realize different supporting modes. Thereby, the expanding members 400' are limited by the limiting portion without being detached from the main body 100A'. Due to the similarity in operational principles with the supporting attachment 1A, the detailed description is omitted.

It is worth mentioning that the tilted portion is exemplary to be formed on the periphery of the first supporting member 200A' adjacent to the main body 100A' in the embodiments. However, in other embodiments, the tilted portion may be formed on a surface of the main body 100A' adjacent to the first supporting member 200A' as long as the functionality for users to easily pry open the first supporting member 200A' can be achieved.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A supporting attachment adapted for a mobile electronic device or a mobile electronic device casing, comprising:
    a joining member adapted to be attached on the mobile electronic device or the mobile electronic device casing;
    a first supporting member;
    at least one expanding member connected between the joining member and the first supporting member, wherein the first supporting member is selectively located in a retracted position or an expanded position relative to the joining member through the at least one expanding member; and
    a second supporting member pivoted to the first supporting member and adapted to abut against a supporting surface.

2. The supporting attachment according to claim 1, further comprising a second pivoting member, wherein the second supporting member is pivoted to the first supporting member through the second pivoting member, and the first supporting member and the second supporting member are adapted to be located at two sides of the second pivoting member.

3. The supporting attachment according to claim 1, wherein the at least one expanding member comprises a first end passing through the joining member and a second end connected to the first supporting member.

4. The supporting attachment according to claim 3, wherein amount of the at least one expanding member is two, the expanding members are symmetrically disposed relative to the first supporting member, the second ends of the expanding members are away from the joining member when the first supporting member is located in the expanded position.

5. The supporting attachment according to claim 3, wherein the joining member comprises an abutting portion selectively abutting against the first end.

6. The supporting attachment according to claim 3, further comprising a first pivoting member separated from the second end, wherein the first supporting member is pivoting to the joining member through the first pivoting member.

7. The supporting attachment according to claim 1, wherein the at least one expanding member is formed with a limiting feature, and the joining member comprises a limiting portion engaged with the limiting feature.

8. The supporting attachment according to claim 1, further comprising a magnetic member or a magneto receiving member, wherein the magnetic member or the magneto receiving member is adapted to be magnetically connected to the mobile electronic device or the mobile electronic device casing.

9. The supporting attachment according to claim 8, wherein the joining member is formed with a magnet accommodating portion adapted to accommodate the magnetic member or the magneto receiving member.

10. The supporting attachment according to claim 1, wherein the first supporting member or the second supporting member is formed with a communication component accommodating portion adapted to accommodate a wireless communication component.

11. The supporting attachment according to claim 1, further comprising a second pivoting member extending parallel to a normal to adjoining surfaces of the first supporting member and the second supporting member, wherein the second supporting member is pivoted to the first supporting member through the second pivoting member.

12. The supporting attachment according to claim 11, wherein the second pivoting member comprises a positioning portion, and the second supporting member is formed with a positioning feature adapted to be engaged with the positioning portion.

13. The supporting attachment according to claim 1, wherein a tilted portion is formed on a periphery of the joining member, and a clearance is formed between an end of the tilted portion and the first supporting member.

14. A mobile electronic device casing adapted for a mobile electronic device, comprising:
    a main body adapted to accommodate the mobile electronic device;
    a first supporting member;
    at least one expanding member connected between the main body and the first supporting member, wherein the first supporting member is selectively located in a retracted position or an expanded position relative to the main body through the at least one expanding member; and a second supporting member pivoted to the first supporting member and adapted to abut against a supporting surface.

15. The mobile electronic device casing according to claim 14, further comprising a second pivoting member, wherein the second supporting member is pivoted to the first supporting member through the second pivoting member, and the first supporting member and the second supporting member are adapted to be located at two sides of the second pivoting member.

16. The mobile electronic device casing according to claim 14, wherein the at least one expanding member comprises a first end passing through the main body and a second end connected to the first supporting member.

17. The mobile electronic device casing according to claim 16, wherein amount of the at least one expanding member is two, the expanding members are symmetrically disposed relative to the first supporting member, the second ends of the expanding members are away from the main body when the first supporting member is located in the expanded position.

18. The mobile electronic device casing according to claim 16, wherein the main body comprises an abutting portion selectively abutting against the first end.

19. The mobile electronic device casing according to claim 16, further comprising a first pivoting member separated from the second end, wherein the first supporting member is pivoting to the main body through the first pivoting member.

20. The mobile electronic device casing according to claim 14, wherein the at least one expanding member is formed with a limiting feature, and the main body comprises a limiting portion engaged with the limiting feature.

21. The mobile electronic device casing according to claim 14, wherein the first supporting member or the second supporting member is formed with a communication component accommodating portion adapted to accommodate a wireless communication component.

22. The mobile electronic device casing according to claim 14, further comprising a second pivoting member extending parallel to a normal to adjoining surfaces of the first supporting member and the second supporting member, wherein the second supporting member is pivoted to the first supporting member through the second pivoting member.

23. The mobile electronic device casing according to claim 22, wherein the second pivoting member comprises a positioning portion, and the second supporting member is formed with a positioning feature adapted to be engaged with the positioning portion.

24. The mobile electronic device casing according to claim 14, wherein a tilted portion is formed on a periphery of the main body, and a clearance is formed between an end of the tilted portion and the first supporting member.

* * * * *